Feb. 25, 1930.  W. F. GROENE  1,748,672
CHUCK IN MACHINE TOOLS
Filed March 7, 1928  6 Sheets-Sheet 1

INVENTOR.
William F. Groene
BY
Geaun Allen
ATTORNEYS

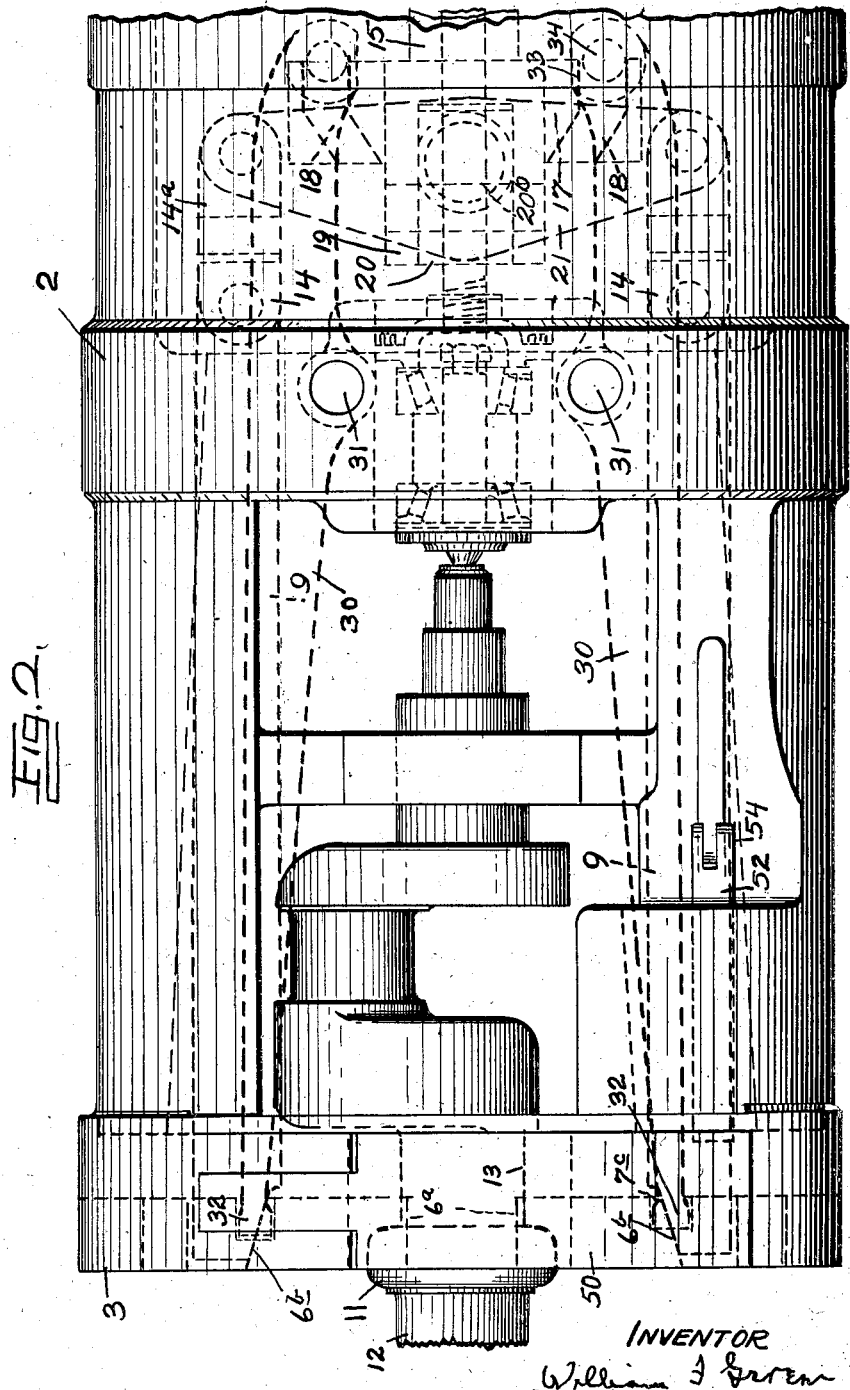

Feb. 25, 1930.  W. F. GROENE  1,748,672
CHUCK IN MACHINE TOOLS
Filed March 7, 1928  6 Sheets-Sheet 3
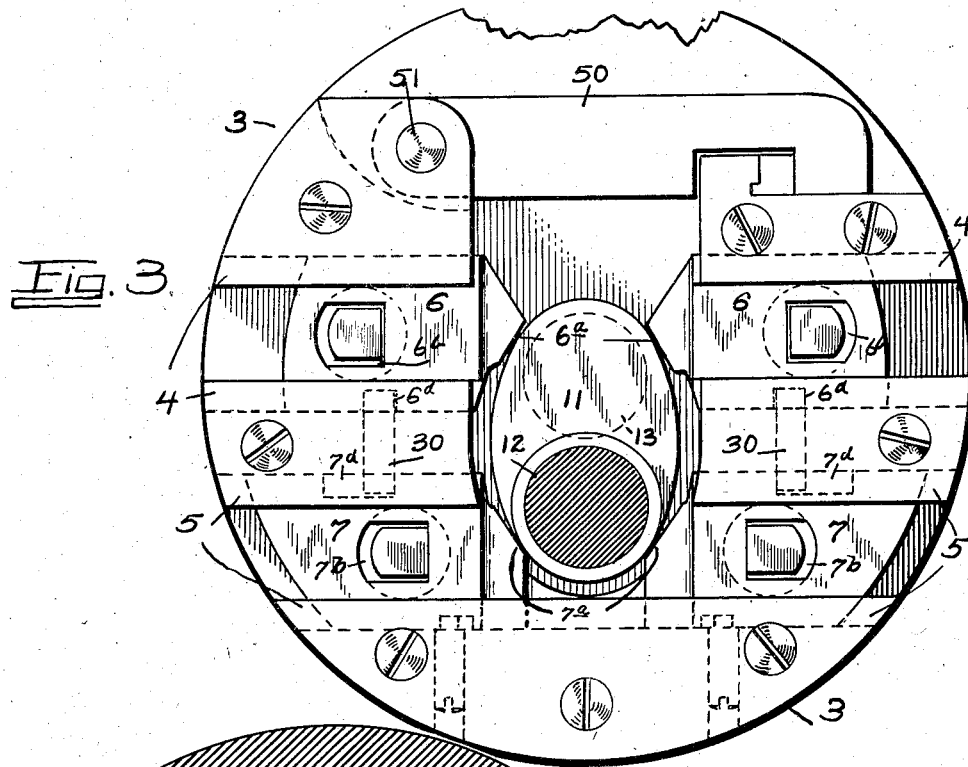
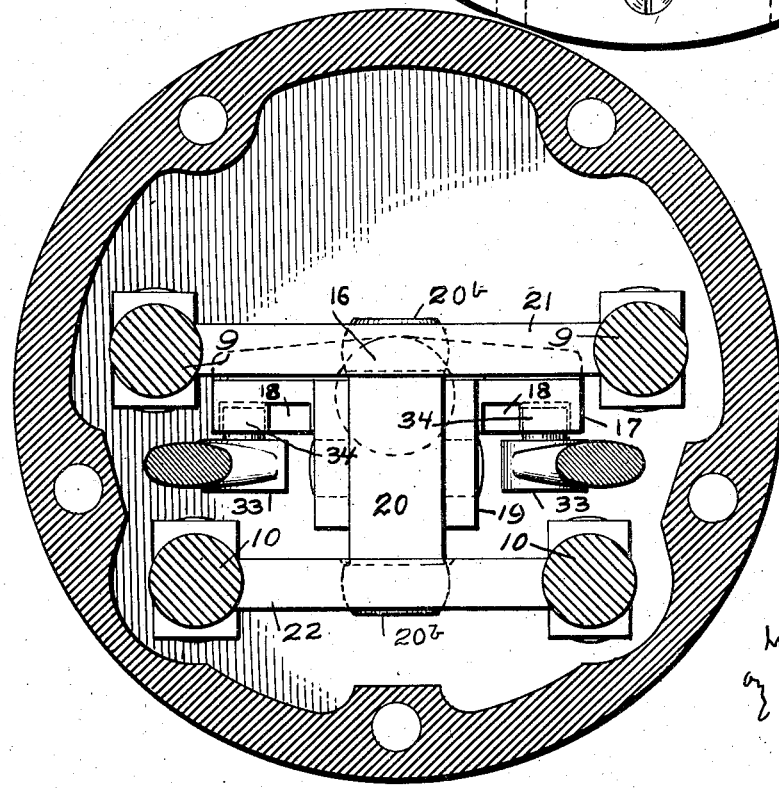
INVENTOR.
William F Groene
ATTORNEYS Feb. 25, 1930. W. F. GROENE 1,748,672
CHUCK IN MACHINE TOOLS
Filed March 7, 1928 6 Sheets-Sheet 4
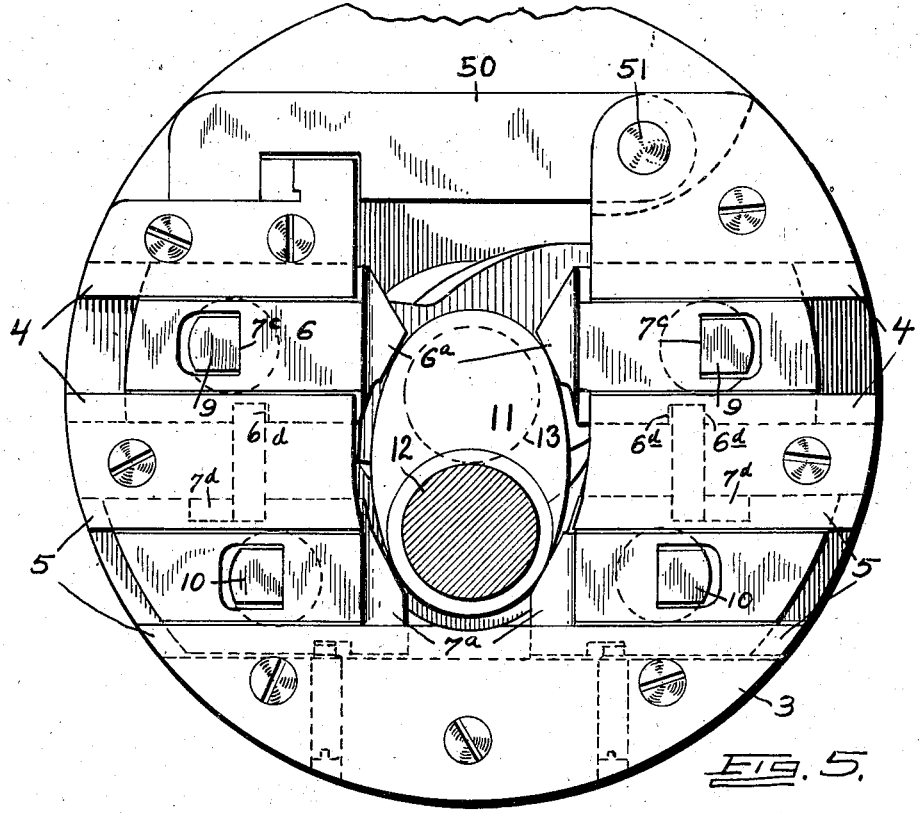

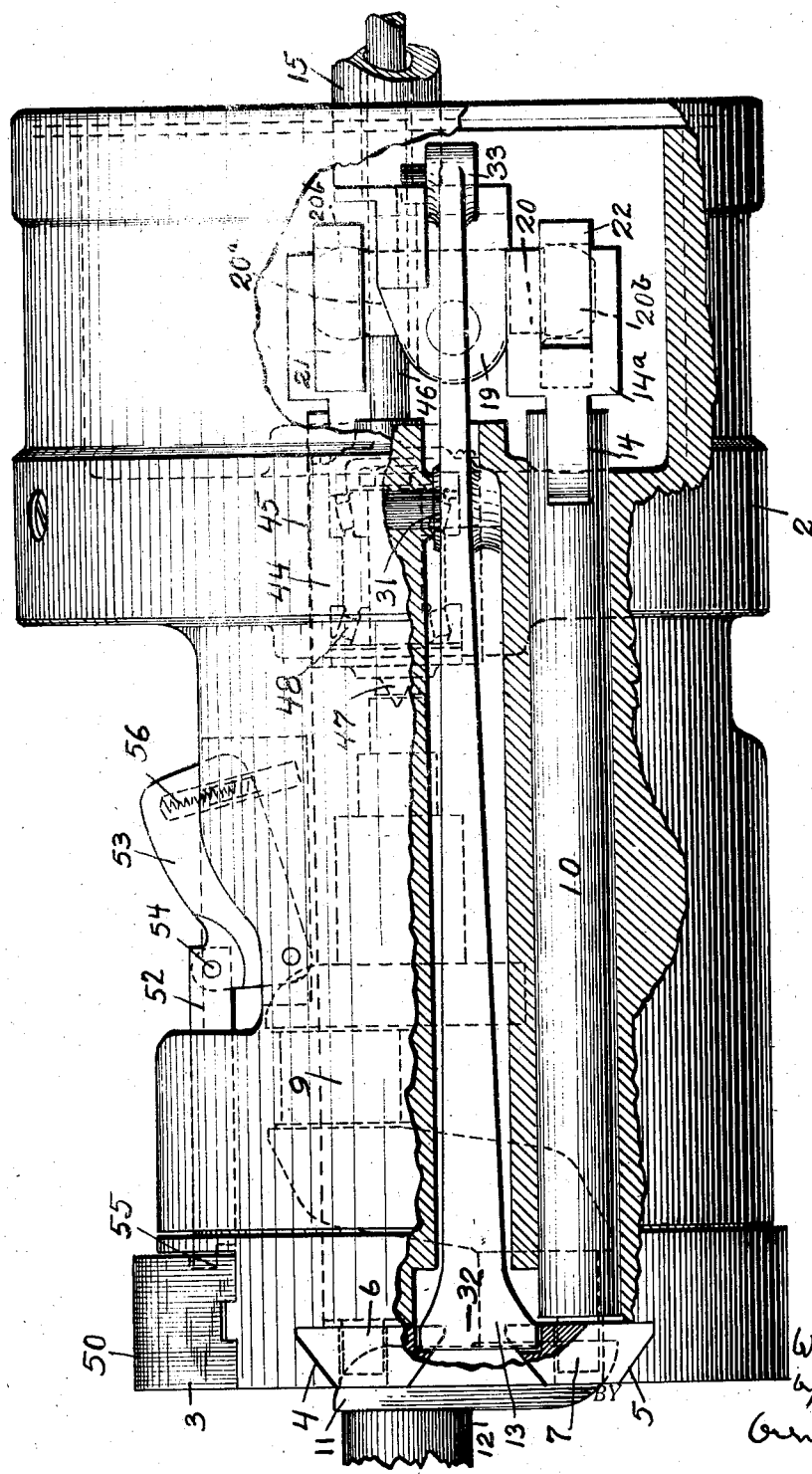

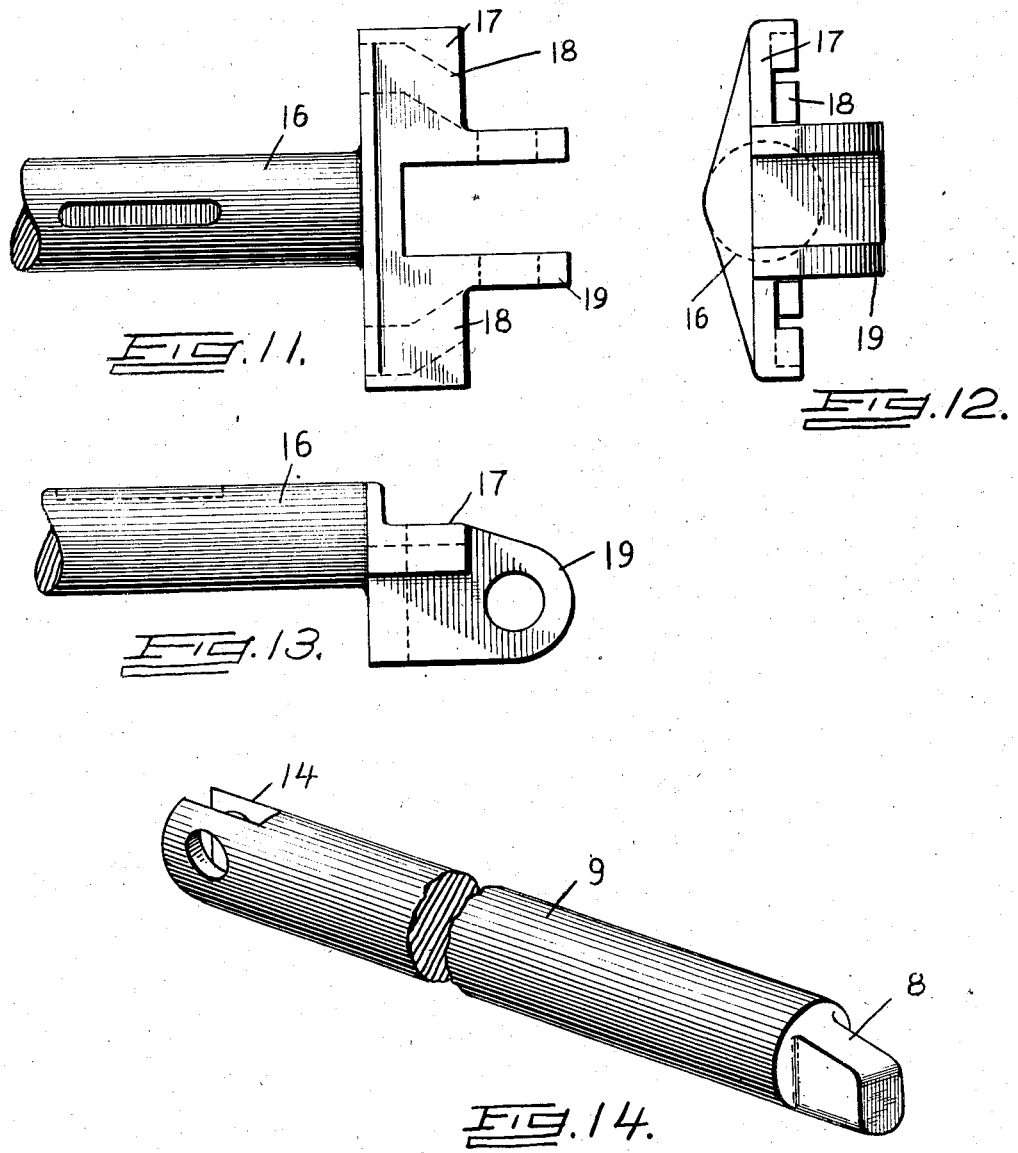

Patented Feb. 25, 1930

1,748,672

UNITED STATES PATENT OFFICE

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE

CHUCK IN MACHINE TOOLS

Application filed March 7, 1928. Serial No. 259,900.

My invention relates to chucks for machine tools which are operated by power means, such as pistons which receive their impulse from pneumatic or oil pressure.

It is the object of my invention to provide a compensating power chuck in which, by automatic means, the pressure imparted by means of the chuck jaws to the piece being grasped in the chuck, is fully equalized. It is also my object to provide for a mode of operation whereby the chuck jaws are applied to the work with an equalizing or compensating action, which action ceases when the jaws are fully applied to the work, so that there is no tendency for the jaws to give way during the treatment of the work so as to result in its getting out of line.

It is also my object in this connection to provide means whereby the jaws can be withdrawn from the work, thus releasing it, the same means being utilized by me for applying the jaws to the work in a preliminary way prior to the maximum wedging action being applied thereto.

In devices in the arts involved, which chiefly concern crank shaft lathes, the defect with equalizing power chucks has been that they do not remain in a definite fixed position due to the equalizing action taking place during the treatment of the work. In an attempt to positively wedge the chuck jaws against the work, the danger is that the withdrawal of the wedges will not relieve the grip, due to the wedges being stuck fast.

By my invention I am enabled to wedge the jaws against the work and also withdraw them from the work, the upper jaws being withdrawn to the greatest extent so that the piece can be removed from the lathe. Also, my invention provides for the possibility of centering a piece of work in the lathe, and then so applying the chuck jaws that the work is not dislodged but remains in centered position, the force being applied to the jaws in two stages of the chuck operation. Also, by my invention the jaws are applied by pressure working through a short path, after a preliminary setting, so that the sudden engagement of the work at all points will not result in forcing it out of true center, it being the primary object that the chuck, operated by power from a suitable piston or the like, will act to grip all faces of a piece of work for which the chuck is designed, with equal pressure, without disturbing the position of the work as centered in the lathe, and that this gripping will be maintained, once it is applied without further equalizing action.

I have illustrated in the drawings a specific embodiment of my invention, intended to illustrate the various points thereof, and will append a description of this embodiment, followed by claims directed to the novelty inherent therein.

In the drawings:—

Figure 2 is a top plan view of the chucking devices of my invention at the tail stock end of the said crank shaft lathe.

Figure 3 is an end elevation of the chucking devices of either form.

Figure 4 is a cross section on the line 4—4 of Figure 1.

Figure 5 is a view similar to Figure 3, showing the jaws engaging a piece of work.

Figure 6 is a perspective of one of the upper chuck jaws.

Figure 7 is a perspective of one of the lower chuck jaws.

Figure 8 is a section on the line 8—8 of Figure 7.

Figure 9 is a section on the line 9—9 of Figure 6.

Figure 10 is a side elevation of one of the chucks partially broken away.

Figure 11 is a plan view of the one end of the operating piston rod with the cam device and connections.

Figure 12 is an end elevation of the parts shown in Figure 11.

Figure 13 is a side elevation of the parts shown in Figure 11.

Figure 14 is a perspective of one of the wedge rods.

Figure 1:
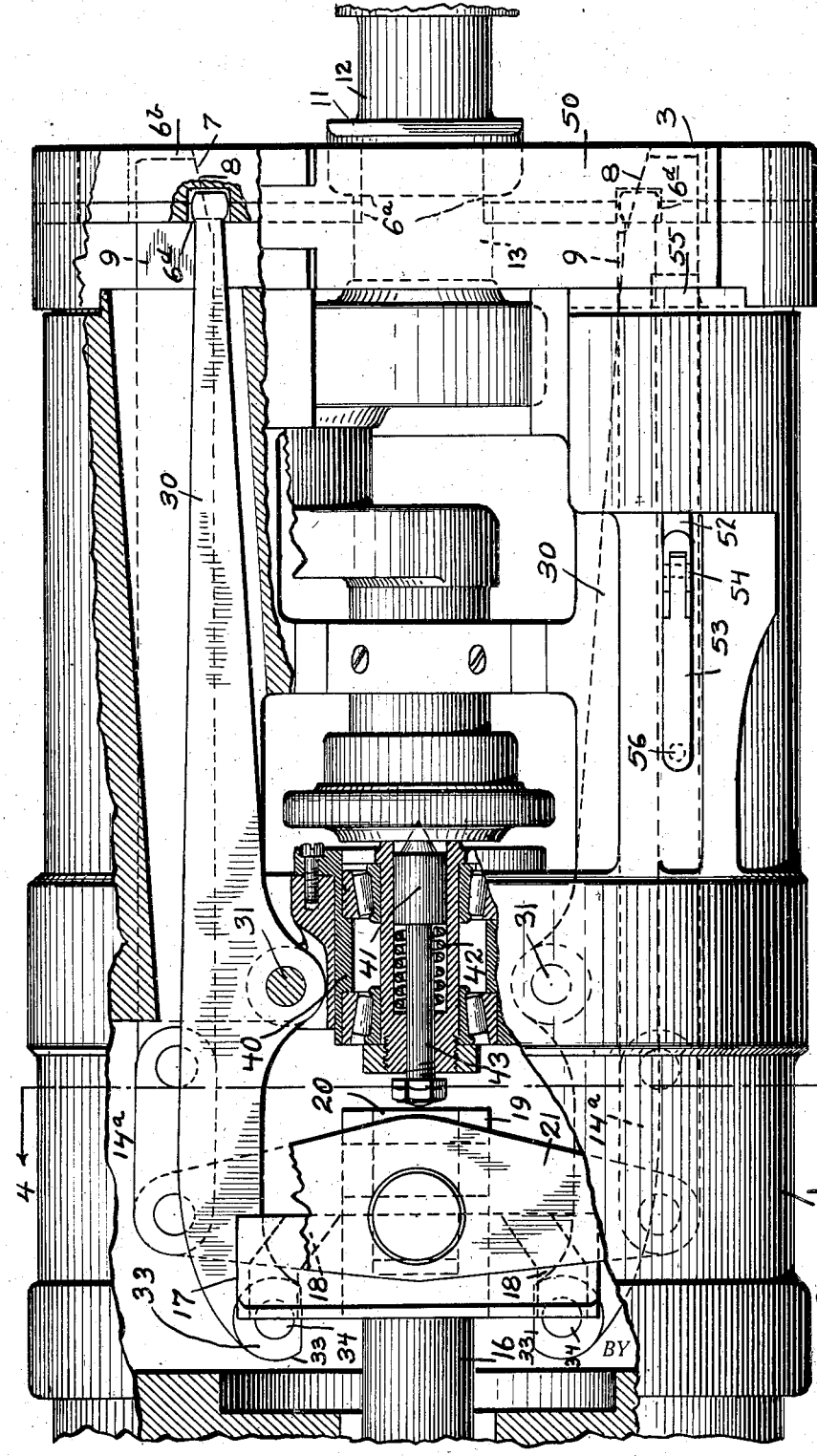
Figure 1 is a top plan view of one of the chucking devices of my invention at the head stock end of a crank shaft lathe partly broken away.

I have illustrated the head end and tail end chucking devices so as to indicate the difference in the operation of the centering pins, the plan of the particular embodiment of my invention being to apply one centering pin by means of power and provide a spring backing for the other centering pin.

In its essence, my chucking device comprises a revolving member which surrounds the work except at the top, and provides a mounting for a series of sliding jaws, which are brought up against the face of the work, which in the illustrated instance, is a crank shaft. Actuating piston rods enter the chucks from the body of the machine along the center of rotation, and impart movement to a frame which has an equalizing motion, and has a pivotal connection to the wedge bars. The wedge bars extend from the frame to the sliding jaws, which jaws have apertures therein with inclined faces that co-operate with the wedges on the ends of the wedge bars, with the result of the wedge bars forcing the jaws against the work. In addition to the equalizing frame, the operating rod imparts movement to a plate having grooves therein, which act as cams to a pair of levers, pivoted in the chuck, and having one of their ends engaged in the cam grooves, and the other engaged in notches in the chuck jaws. The cam grooves are so arranged that just before the wedges operate upon the chuck jaws, the levers are swung on their pivots and move the jaws up against the work. Also, when the operating rod is reversed to withdraw the wedge bars from the chuck jaws, the levers again come into play and positively move the chuck jaws, the upper set first, out of gripping contact with the work, thus permitting its ready withdrawal.

As was noted in the case of the two types of centering pins, the operated centering pin is brought into retaining engagement with the work before the chuck jaws are operated, and this forces inwardly the other centering pin, which has a spring behind it. When the operated centering pin is withdrawn, the spring will move the idle centering pin forward and not permit the work to drop down in the chuck, which would impair its easy withdrawal, and might break some part of the mechanism. From the above it will be noted that it has been my general object to provide a chucking device, which is power operated, but which provides for as much or more accuracy of engagement, than hand operated chucking devices which require considerable time, and a large degree of individual skill to put into operation.

Referring to the drawings, the chuck body of the chuck at the head end of the lathe has been indicated at 1, and the body of the tail end chuck has been indicated at 2. These chuck bodies are, as illustrated, particularly designed for crank shaft lathes, and have bodies which are U-shaped intermediate their ends to clear the work between the centering pins and the chuck jaw head. Where the parts are the same and operated in the same manner in the head and tail chucking devices, they will be referred to by the same number.

The outer ends of the chuck bodies, as indicated at 3, in the drawings, are bolted to the chuck bodies proper, and each provides four slideways 4, 4, and 5, 5, for the upper chuck jaws 6, 6, and the lower chuck jaws 7, 7. These two types of jaws (see Figs. 6–9) are adapted particularly for crank shaft chucks, and have engaging faces $6^a$ and $7^a$ respectively, and apertures $6^b$ and $7^b$ therein, the outer walls of which are inclined, as at $7^c$, to co-operate with the inclined faces 8 on the ends of the wedge bars 9, 9, and 10, 10, for the upper and lower jaws respectively.

In Fig. 5, the faces of the wedge bars are in contact with the jaw aperture walls, and the jaws are in gripping engagement with the crank portion 11 of a crank shaft of which the crank pins are indicated at 12, and the journals at 13.

In Fig. 3, the wedge bars are withdrawn so that the jaws may be retracted from the work by the operation of the cam arms.

The wedge bars are supported slidably in the chuck body, and terminate in forks 14, which are used for connecting the bars to the equalizing frame. The construction for operating the two upper wedge bars is the same as that for the two lower ones.

A piston actuated sleeve 15, in the case of one of the chuck bodies, and the piston actuated rod 16, in the case of the other, enters the chuck body from the stock of the machine along the axis of rotation of the chuck body. The rod has secured thereon in a fixed position, or integrally formed therewith, a cam block 17, which has cam grooves 18, 18 therein. That portion of the rod which extends past the cam block is formed as a depressed fork or yoke 19 which is pivoted to an equalizer member 20, which has a hole $20^a$ in the instance of the piston operated center (Fig. 10) to clear the inner piston rod. The member 20 has a central portion which is engaged within the yoke 19, and terminates in upper and lower ball arms $20^b$.

Referring to Fig. 10, in connection with Fig. 1, and Fig. 4, it will be noted that the two upper wedge bars 9, 9 have the pivot links (noted at $14^a$ for all wedge bars) which engage in the outer ends of the upper equalizer frame member 21. The same is true for the two lower wedge bars 10, 10 and the lower equalizer frame member 22. The two frame members are arranged to engage over the ball like ends of the arm $20^b$.

The result of this construction is that when the piston rod is forced in one direction through the center of the chuck body, the two wedge rods are thrust forward. As pressure is applied to the chuck jaws by the rods the frame members 21 and 22 can adjust themselves to equalize the pressure assisted by the several pivotal relationships noted, so that the jaws will bear with equal force against the work. The angle of the wedging faces of the rods and the jaws, however, and the sliding jaw structure in the chuck body, are constructed so that once the pressure is applied to the work, there will be no chance that the application of strains to the chuck jaws will force the wedge bars rearwardly out of wedging position, thus rocking the equalizer elements.

In order to move the chuck jaws away from engagement with the work, and also to move them into a preliminary engagement with the work before gripping it tightly, I provide a pair of levers 30, which are pivoted at 31, 31, in the chuck body, and have outer ends 32 which are expanded so as to be roughly triangular. The upper and lower chuck jaws, have notches at 6$^d$ and 7$^d$, which engage the triangular ends noted. Thus each pair consisting of one upper and one lower jaw piece, will be conjointly engaged by a single one of the levers. It will be noted that the notches 7$^d$ are considerably wider than the ends of the levers, while the notches 6$^d$ are of about the same width. The result of this is that when the levers are swung to force the two sliding jaw pieces inwardly toward the work, they will both be moved inwardly alike, but that in the withdrawing action, the upper set of jaws will be withdrawn first.

This facilitates the action by using the lever to overcome the frictional inertia of only two of the jaws at a time, in unclamping the work, and the two jaws which are moved out of position are the two upper jaws, which permits the work to be withdrawn from the chuck by lifting it away from the lower jaws, thus avoiding the chance of the work dropping down into the chuck, and striking against tools, rests, etc., with consequent injury.

To operate the two levers I employ the cam block 17, which has been noted as mounted over the end of the piston rod behind the equalizer frame. The two levers have inner ends 33, which have rollers 34 thereon, which extend up into the cam grooves 18 in the block 17. The grooves are so arranged that when the piston rod is moved in one direction to engage a piece of work in the chuck, the two levers are first caused to swing toward each other at the chuck jaw ends thereof, due to the spreading of the cam grooves. The piston rod may then move further without affecting the levers, due to the straight portion of the cam grooves, thus forcing the jaws tight against the work. The withdrawal of the piston rod will permit the wedge rods to be withdrawn first from the clamping engagement with the chuck jaws, whereupon the slanting portions of the cam grooves 18 will force the inner ends of the two levers together, spreading the outer ends, and thus drawing away first the two upper chuck jaws, and then the two lower ones.

With relation to the centers in the chucks, I have illustrated in Fig. 1 a block 40 set firmly into the chuck frame, which block has a centering pin 41 set slidably in a hole therein. This hole contains a spring 42 which surrounds a shank 43 of the pin that is smaller than the main body, and bears against the main body. The centering pin cannot be thrust entirely back into the hole in the block on account of its shank, and the spring maintains the pin in position of engaging the end of a crank shaft or other work piece which is to be engaged.

In the chuck housing having the piston actuated center, (Figs. 2 and 10) I provide a sliding block 44 which moves in a suitably arranged cavity 45 in the chuck body. Inside of the sleeve type piston rod 15 is a central piston rod 46, having an independent source of power, which rod clears the equalizer ball arm element, and engages the sliding block 44, being suitably threaded thereinto.

The centering pin 47 is in this case mounted in a roller bearing cage 48 held in the sliding block, and the apex of the pin projects from the block so as to engage the work.

With this construction a shaft is set in place and carefully centered, using the spring centering pin to hold it in place. Power is applied to move the rod 46, while the shaft is held in exactly the desired position, which results in forcing the spring centering pin inwardly, and holding the shaft at proper center, and also in adjusted angular relation while the chuck jaws are brought into play in the manner already noted.

Since the outer end of the chuck housing is hollow or U-shaped in order to permit of insertion of the crank shaft to be turned into the lathe, it is desirable to provide an element to hold the two unsupported edges of the outer head together.

To this end I provide a bar 50 pivotally held to a stud 51 in the outer chuck head, which bar is moved out of the way while inserting and removing the work, and when the work is to be clamped in place, is swung down so as to close the top of the chuck head, or straddle the U-shaped space, and is held down in place by a sliding dog 52. This dog is actuated by a lever 53 (Fig. 10) secured to the dog pivotally at 54, and abutting against a shoulder 55 on the chuck. There is a spring plunger 56 in the outer end of the lever which forces the lever upwardly at its outer end, and thus tends to throw the dog 52 into position of locking the cross bar 50.

The advantage of this structure is that an operator will naturally lean his weight on the lever 53, when taking the work out of the chuck, which will release the cross bar and avoid impeding the removal of the work.

Having thus described my invention, what I claim as new and desire to secure by Letters Patent, is:—

1. In a chucking device for crank shafts and the like, a body into which a piece of work is placed, gripping devices to engage the work, compensating power means including a fluid pressure operated equalizer and wedges operated thereby for moving the gripping devices into engagement with the work and holding them so, and means engaging said gripping devices for moving same away from the work when the first means is released.

2. In a chucking device for crank shafts and the like, a body into which a piece of work is placed, gripping devices to engage the work, compensating power means including wedges for moving the gripping devices into engagement with the work and holding them so, and means engaging said gripping devices for moving same away from the work when the first means is released, said different means also operated by power.

3. In a chucking device for crank shafts and the like, a body into which a piece of work is placed, gripping devices to engage the work, means including wedges for moving the gripping devices into engagement with the work and holding them so, and means engaging said gripping devices for moving same away from the work when the first means is released and toward contact with the work before the first means is set in motion.

4. In a chucking device for crank shafts and the like, a body into which a piece of work is placed, gripping devices to engage the work, compensating power means including wedges for moving the gripping devices into engagement with the work and holding them so, and means engaging said gripping devices for moving same away from the work when the first means is released, said last mentioned means also operated by power, and arranged to move the gripping means toward contact with the work before the first named means is set in motion.

5. In a chucking device for crank shafts and the like, a body into which a piece of work is placed, gripping devices to engage the work, compensating power means including wedges for moving the gripping devices into engagement with the work and holding them so, and different means to move the gripping devices away from the work when the first means is released, said different means also operated by power, and arranged to move the gripping means toward contact with the work before the first named means is set in motion, and means in connection with a single source of power to energize the power means for both of said actuators of the gripping means in a prearranged timed relation.

6. In a chucking device, a member into which a portion of a piece of work is placed, gripping jaws movably mounted in said member so as to move into and out of contact with the work, at two upper and two lower points, power means including wedges for moving the jaws toward the work, and power means for moving the jaws away from the work, the last named means arranged to move the upper jaws a greater distance than the lower jaws.

7. In a chucking device, a member into which a portion of a piece of work is placed, gripping jaws movably mounted in said member so as to move into and out of contact with the work, and means for moving the jaws into the work comprising sliding bars having wedging means for moving the jaws, and means for moving the jaws away from the work comprising levers engaging the jaws.

8. In a chucking device, a member into which a portion of a piece of work is placed, gripping jaws movably mounted in said member so as to move into and out of contact with the work, and means for moving the jaws into the work comprising sliding bars having wedging means for moving the jaws, and means for moving the jaws away from the work comprising levers engaging the jaws, a power piston and rod, a compensating member actuated thereby for moving the bars, and a cam member actuated thereby for moving the levers.

9. In a chucking device, a member into which a portion of a piece of work is placed, gripping jaws movably mounted in said member so as to move into and out of contact with the work, and means for moving the jaws into the work, and means for moving the jaws away from the work comprising levers engaging the jaws, said jaws arranged as an upper and lower jaw on each side of the member, the jaws having notches therein to be engaged by the levers, there being two levers, one for the pair at each side of the member.

10. In a chucking device, a member into which a portion of a piece of work is placed, gripping jaws movably mounted in said member so as to move into and out of contact with the work, and means for moving the jaws into the work, and means for moving the jaws away from the work comprising levers engaging the jaws, said jaws arranged as an upper and lower jaw on each side of the member, the jaws having notches therein to be engaged by the levers, there being two levers, one for the pair at each side of the member, the notches in the lower one in each lever actuated pair being longer than in the upper pair, for the purpose described.

WILLIAM F. GROENE.